(12) United States Patent
Hussain et al.

(10) Patent No.: US 9,587,546 B2
(45) Date of Patent: Mar. 7, 2017

(54) METHODS AND SYSTEMS FOR HYBRID VEHICLE WASTE HEAT RECOVERY

(71) Applicant: Ford Global Technologies, LLC, Dearborn, MI (US)

(72) Inventors: Quazi Ehtesham Hussain, Holland, OH (US); David Richens Brigham, Ann Arbor, MI (US); Mark John Jennings, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 14/044,506

(22) Filed: Oct. 2, 2013

(65) Prior Publication Data

US 2015/0089943 A1     Apr. 2, 2015

(51) Int. Cl.
*F01N 5/02*     (2006.01)
*F02G 5/04*     (2006.01)

(52) U.S. Cl.
CPC ............... *F01N 5/02* (2013.01); *F02G 5/04* (2013.01); *Y02T 10/16* (2013.01); *Y02T 10/166* (2013.01); *Y10S 903/905* (2013.01)

(58) Field of Classification Search
CPC .............................. F01K 23/065; F01K 23/14
USPC .......... 60/604, 614, 615, 616, 618, 620, 661
See application file for complete search history.

(56) References Cited

U.S. PATENT DOCUMENTS

| | | | |
|---|---|---|---|
| 5,553,662 A | 9/1996 | Longardner et al. | |
| 6,059,016 A | 5/2000 | Rafalovich et al. | |
| 7,353,661 B2 | 4/2008 | Wang et al. | |
| 7,428,816 B2 | 9/2008 | Singh et al. | |
| 2007/0175212 A1* | 8/2007 | Uno | F01C 13/04 60/519 |
| 2009/0000299 A1* | 1/2009 | Ast | F01K 23/04 60/618 |
| 2011/0083831 A1* | 4/2011 | Richter | F01N 5/025 165/120 |
| 2011/0088397 A1* | 4/2011 | Mori | F01K 23/065 60/661 |

(Continued)

FOREIGN PATENT DOCUMENTS

| | | | | |
|---|---|---|---|---|
| JP | 2005042618 A | * | 2/2005 | ............... F02G 5/02 |
| JP | 2008231980 A | * | 10/2008 | ............... F02G 5/04 |

(Continued)

OTHER PUBLICATIONS

Hussain, Quazi E. et al., "Methods and Systems for Utilizing Waste Heat for a Hybrid Vehicle," U.S. Appl. No. 14/044,438, filed Oct. 2, 2013, 42 pages.

(Continued)

*Primary Examiner* — Thomas Denion
*Assistant Examiner* — Mickey France
(74) *Attorney, Agent, or Firm* — David Kelley; John D. Russell; B. Anna McCoy

(57) ABSTRACT

Systems and methods for operating an engine that includes an exhaust gas heat recovery system are described. The system may selectively or contemporaneously supply energy from engine exhaust gas to generate electricity or warm the engine. In one example, exhaust gas energy raises a temperature of a heat transfer medium and the heat transfer medium is routed to an engine coolant heat exchanger or an expander via a bypass valve.

19 Claims, 5 Drawing Sheets

(56) References Cited

U.S. PATENT DOCUMENTS

| | | | |
|---|---|---|---|
| 2011/0115445 A1* | 5/2011 | Bronicki | F01K 13/02 322/24 |
| 2011/0271677 A1* | 11/2011 | Teng | F01K 13/02 60/715 |
| 2012/0102934 A1 | 5/2012 | Magnetto | |
| 2012/0168111 A1 | 7/2012 | Soukhojak et al. | |
| 2013/0068202 A1* | 3/2013 | Kardos | F01P 3/20 123/563 |
| 2013/0099012 A1 | 4/2013 | Roos et al. | |
| 2013/0205776 A1* | 8/2013 | Yin | F01K 25/10 60/615 |

FOREIGN PATENT DOCUMENTS

| | | |
|---|---|---|
| WO | 2009080153 A1 | 7/2009 |
| WO | WO 2009133619 A1 * | 11/2009 |
| WO | WO 2011122294 A1 * | 10/2011 |
| WO | WO 2014031349 A1 * | 2/2014 |

OTHER PUBLICATIONS

Anonymous, "Improved waste heat performance in a Fuel Cell System for Evaporative Cooling of stack inlet water flow, using fuel cell stack as heat source," IPCOM No. 000226549, Published Apr. 15, 2013, 2 pages.

* cited by examiner

METHODS AND SYSTEMS FOR HYBRID VEHICLE WASTE HEAT RECOVERY

FIELD

The present description relates to a system and method for recovering waste heat of a hybrid vehicle. The system and methods described herein provide for recovering heat from exhaust gases to reduce engine warm-up time and generate electrical power.

BACKGROUND AND SUMMARY

An internal combustion engine converts a portion of chemical energy in a fuel into rotational energy and heat. A portion of heat energy generated by the engine may be regarded as waste heat energy. U.S. Pat. No. 7,353,661 describes a system where engine heat is extracted from engine coolant or exhaust gases to power a generator. A same refrigerant that is used to generate electricity is also used to cool a cabin of a vehicle. The electricity produced from engine heat may be stored in a battery or used within the vehicle. However, it may not always be beneficial to extract heat from the engine to produce electricity. For example, it may not be desirable to extract heat from the engine when the engine is being started from cold conditions because engine emissions and fuel economy may degrade. Consequently, the system may not be operated, or if the system is operated during cold engine conditions, it may not provide a desired output.

The inventors herein have recognized the above-mentioned disadvantages and have developed an engine system, comprising: an engine including an evaporator position along an exhaust system; an expander in fluidic communication with the evaporator; a condenser in fluidic communication with the evaporator; an engine coolant heat exchanger in thermal communication with the condenser, the engine coolant heat exchanger including an output that is in fluidic communication with an input of the evaporator.

By extracting engine exhaust gas heat, it may be possible to both generate electricity and improve engine warm-up so as to improve engine fuel economy and emissions. In particular, heat extracted from engine exhaust may be routed to an expander and/or to an engine heat exchanger where engine exhaust heat may be transferred to engine coolant to heat the engine. The warmed engine coolant may allow the engine to reach a desired engine operating temperature in a shortened period of time, thereby reducing engine emissions and improving fuel economy. In one example, a bypass valve may be selectively operated to route a heat transfer medium or working fluid to either or both of an expander and an engine coolant heat exchanger. In this way, it may be possible to improve the functionality of an exhaust gas heat recovery system.

The present description may provide several advantages. In particular, the approach may improve engine starting emissions and fuel economy by reducing engine warm-up time. Further, the approach may extract engine heat from several locations so that less engine exhaust gas heat may be necessary to operate an expander that rotates a generator. Further still, the approach may provide heat to a vehicle cabin sooner than systems that rely solely on heat from an engine block to provide cabin heat.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
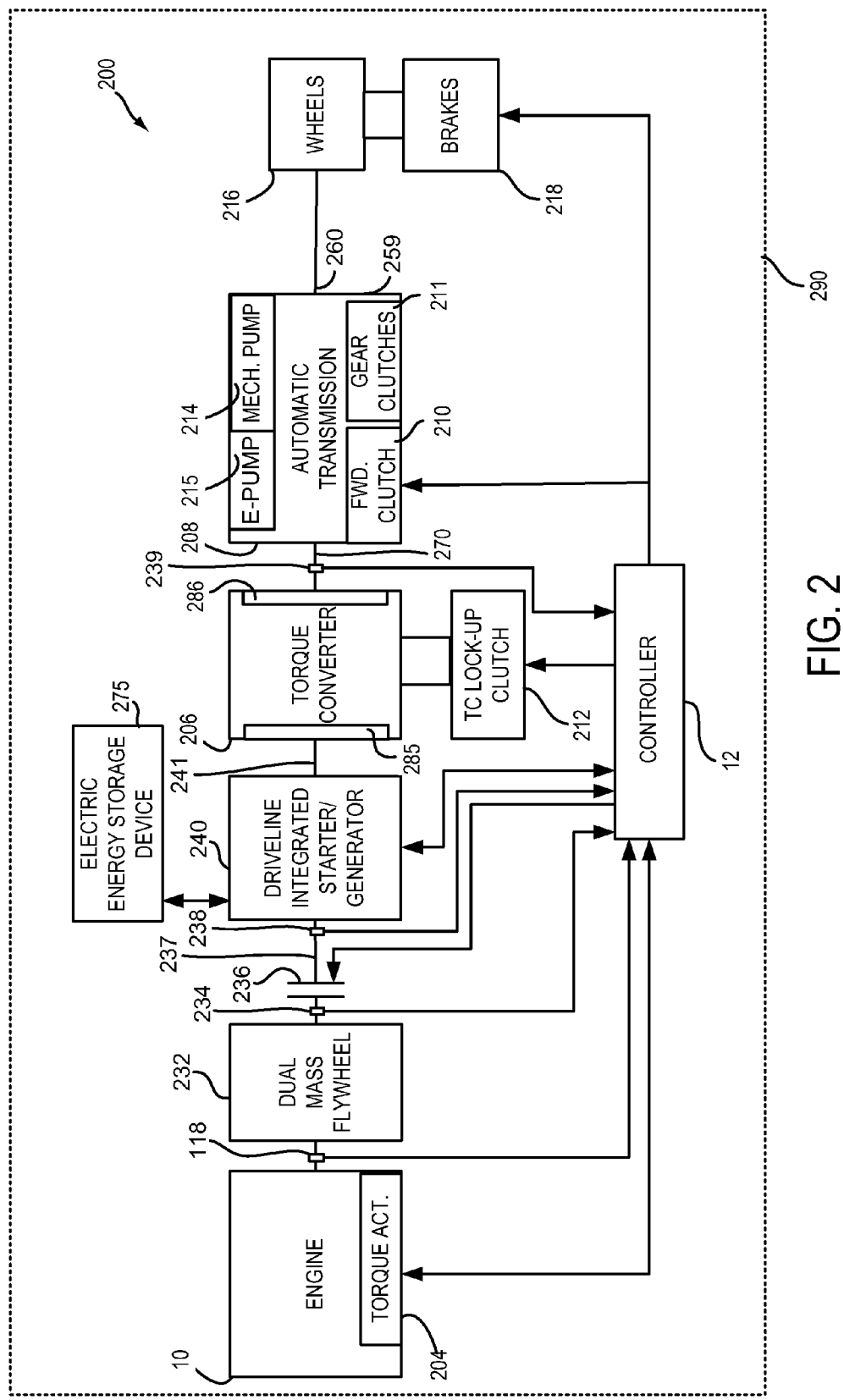
FIG. 2 shows an example vehicle driveline configuration.
Figure 3:
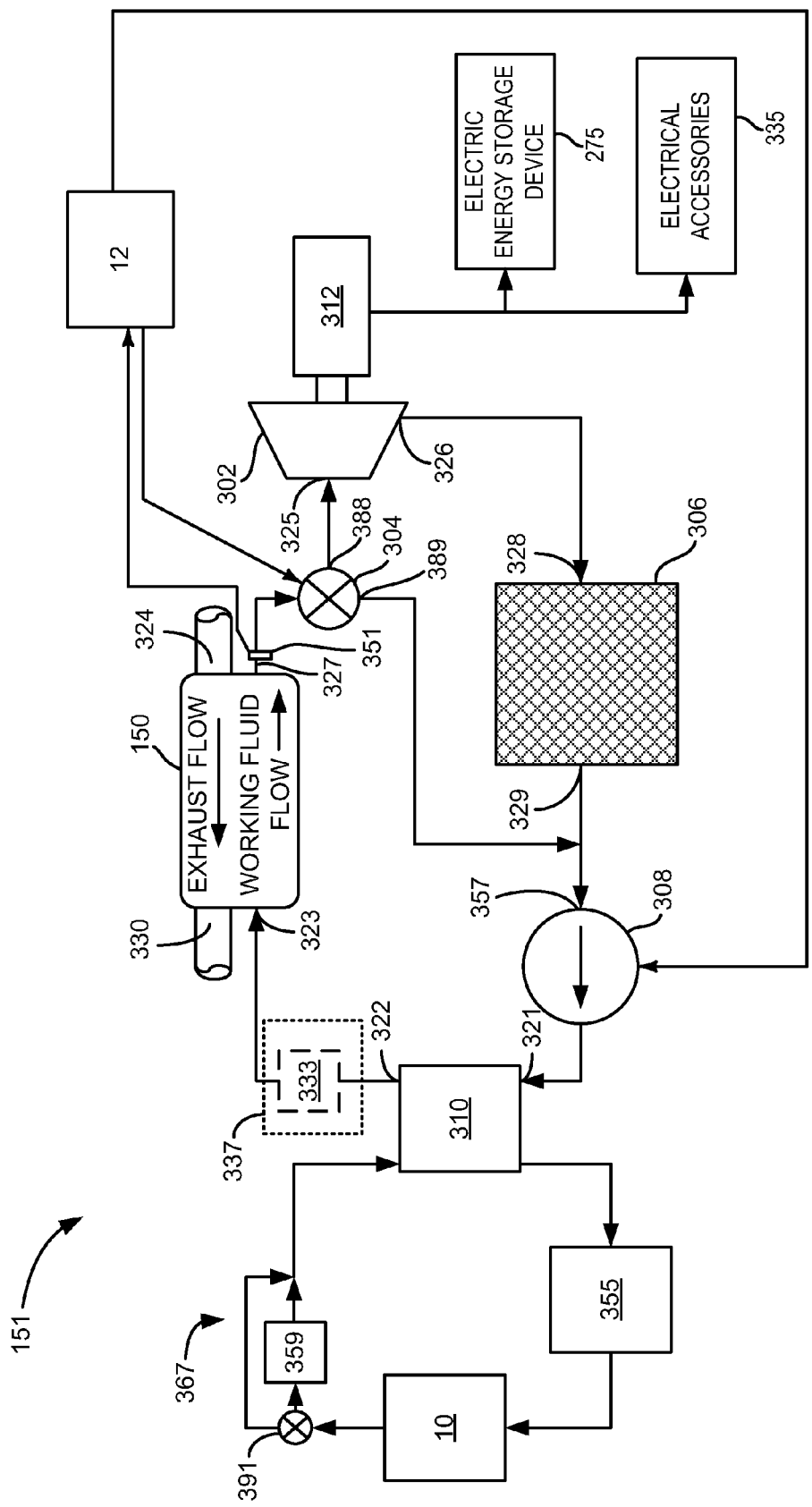
FIG. 3 shows a schematic view of an exhaust gas heat recovery system.

The present description is related to recovering energy from engine exhaust gases and using the recovered energy to improve vehicle operation. Exhaust gas energy may be recovered from an engine of the type described in FIG. 1, or a diesel engine. The engine may be part of a hybrid vehicle as is shown in FIG. 2. Energy may be extracted from engine exhaust gases via an exhaust gas energy recovery system as is shown in FIG. 3. The exhaust gas energy recovery system may be operated according to the method described by the flowchart shown in FIG. 4. The engine and exhaust gas heat recovery system may be operated in a sequence as shown in the sequence of FIG. 5.

Figure 1:
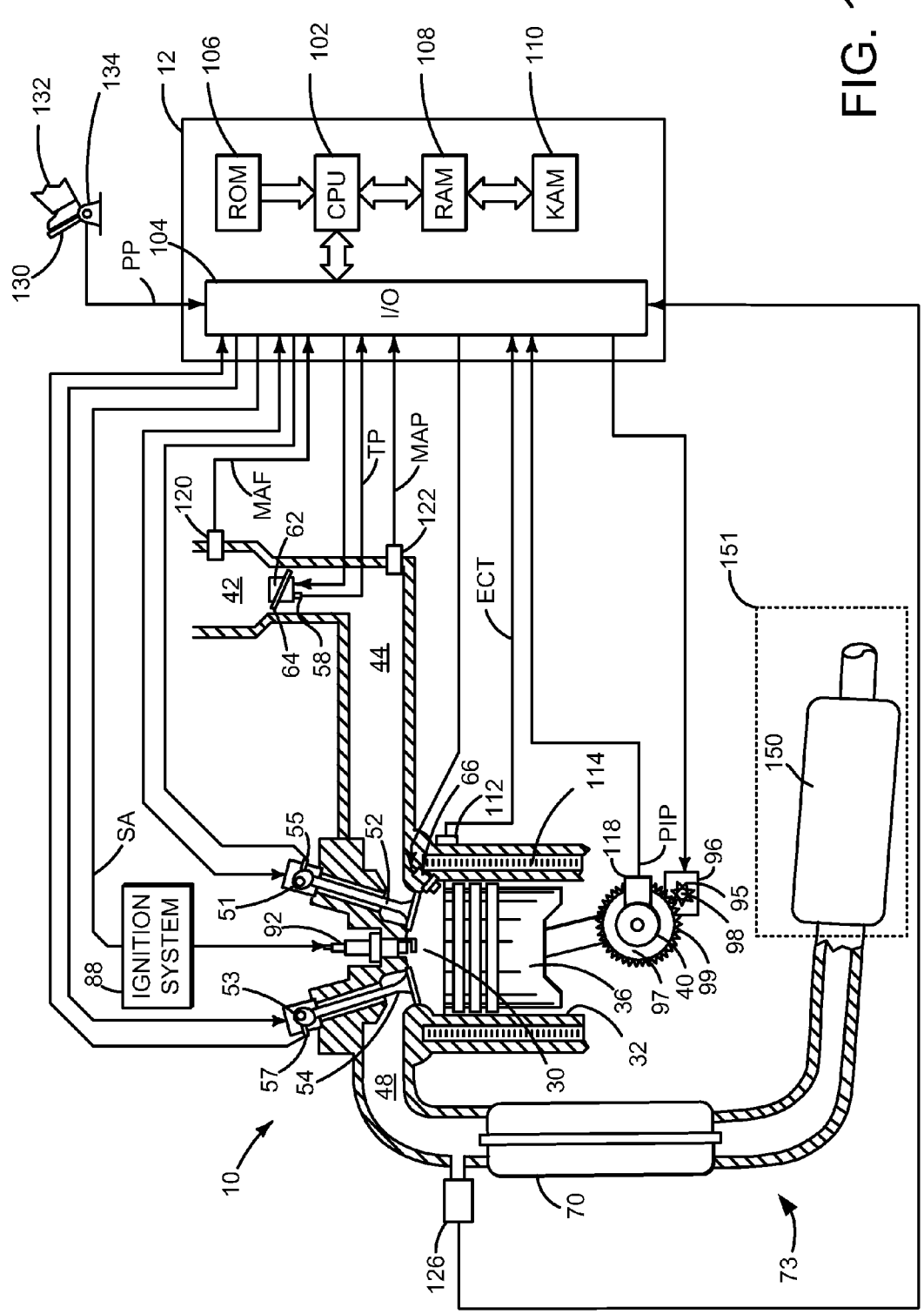
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70 in exhaust system 73. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. The exhaust system also includes an evaporator 150 for extracting energy from exhaust gases. Evaporator 150 is shown positioned in the exhaust system of engine 10 downstream of converter 70 and it is part of exhaust gas heat recovery system 151. Alternatively, evaporator 150 may be positioned upstream of converter 70.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) or electric machine 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 may be positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is hydraulically operated via controller 12 adjusting a position of a control valve. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285 (e.g., a hydraulic torque path), thereby enabling torque multiplication. In contrast, when torque converter lock-up clutch 212 is fully engaged, the engine output torque is directly transferred via the torque converter clutch to an input shaft (not shown) of transmission 208 (e.g., the friction torque path). Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-10) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may control the engagement of wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical pump 214 may supply pressurized transmission fluid to automatic transmission 208 providing hydraulic pressure to engage various clutches, such as forward clutch 210, gear clutches 211, engine disconnect clutch 236, and/or torque converter lock-up clutch 212. Mechanical pump 214 may be operated in accordance with torque converter 206, and may be driven by the rotation of the engine or DISG via input shaft 241, for example. Thus, the hydraulic pressure generated in mechanical pump 214 may increase as an engine speed and/or DISG speed increases, and may decrease as an engine speed and/or DISG speed decreases.

An electric pump 215 may also be provided to increase transmission line pressure when the DISG is spinning at speeds less than 300 RPM for example. Electric pump 215 may be selectively operated via controller 12 in response to DISG speed. Thus, mechanical pump 214 may supply transmission line pressure when the DISG speed is greater than a threshold speed while electrical pump 215 is not activated. However, when DISG speed is less than the threshold speed, electrical pump 215 may be activated to supply transmission line pressure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When engine stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

Referring now to FIG. 3, a detailed schematic of an exhaust gas heat recovery system 151 is shown. The exhaust gas heat recovery system 151 is included in the system of FIGS. 1 and 2. Exhaust gas heat recovery system 151 may be controlled via the method of FIG. 4.

Evaporator 150 transfers heat energy from engine exhaust gases to a working fluid that flows through evaporator 150. Working fluid may be comprised of a glycol/water mixture, carbon hydrides, or other heat transfer medium. Working fluid enters evaporator 150 in a liquid phase and exits in a gaseous phase when engine exhaust gas temperature is sufficient to initiate a phase change in the working fluid. If the engine exhaust temperature is too low to support a phase change, warmed liquid phase working fluid may exit evaporator 150. Engine exhaust gas enters evaporator 150 at exhaust inlet 324 and exits at exhaust outlet 330. Heat transfer medium (e.g., liquid) enters evaporator 150 at heat transfer medium input 323 and exits evaporator 150 at heat transfer medium outlet 327.

Valve 304 directs gaseous phase or liquid phase working fluid to either or both of expander 302 and exhaust gas heat recovery system pump 308. Alternatively, valve 304 directs gaseous phase or liquid phase working fluid to either or both of expander 302 and heat exchanger 310 if pump 308 is placed in the circuit forming exhaust gas heat recovery system 151 at a location between heat exchanger 310 and evaporator 150. Heat transfer medium or working fluid enters expander 302 at inlet 325 and exits at outlet 326. In a first operating state, a first outlet 388 valve 304 directs working fluid from evaporator 150 solely to expander 302.

In a second operating state, a second outlet 389 of valve 304 directs working fluid from evaporator 150 solely to inlet 357 of exhaust gas heat recovery system pump 308 or alternatively to inlet 321 of engine coolant heat exchanger 310. In a third operating mode, valve 304 directs working fluid from evaporator 150 to inlet 357 of exhaust gas heat recovery system pump 308 and expander 302 or inlet 321 of engine coolant heat exchanger 310.

By supplying working fluid directly to the inlet of exhaust gas heat recovery system pump 308 or heat exchanger 310, heat energy from exhaust gases may be transferred to coolant of engine 10 via heat exchanger 310. The heat transfer medium or working fluid enters at inlet 321 and exits at outlet 322. Additionally, heat energy from exhaust gases may be transferred to the vehicle passenger cabin 337 via heater core 333. Alternatively, heater core 333 may be included in engine cooling circuit 367 so as to receive heated engine coolant from heat exchanger 310. Heating engine coolant via heat exchanger 310 may allow the engine to warm-up sooner so that engine fuel economy may be increased and so that engine emissions may be reduced. Providing heat to the vehicle passenger cabin 337 may reduce the need to operate an electric heater to heat the cabin when the engine is stopped for a short period of time and reduce electrical energy to heat the cabin if an electric heater is provided.

During periods when engine coolant temperature is low (e.g., during cold engine starts), exhaust gas heat energy may also be transferred to transmission and/or axle 355 via heated coolant flowing through heat exchanger 310. Alternatively, transmission and/or axle 355 may be part of a cooling circuit that is a separate cooling circuit from the cooling circuit that includes heat exchanger 310. Engine coolant temperature of engine 10 may be lowered via vehicle radiator 359 which transfers heat from engine coolant to ambient air. Engine coolant bypass valve 391 allows engine coolant to enter or bypass radiator 359. Exhaust gas heat recovery system valve 304 is positioned to direct working fluid directly from evaporator 150 to the inlet of exhaust gas heat recovery system pump 308 during periods when engine coolant temperature is less than a warm engine coolant temperature (e.g., 88° C.). The position of exhaust gas heat recovery system valve 304 may be based on output of temperature sensor 351 which is located at heat transfer medium outlet 327 of exhaust gas heat recovery system evaporator 150.

The exhaust gas heat recovery system valve 304 directs gaseous phase working fluid to expander 302 in first and third modes. Gas expands in expander 302 thereby rotating generator 312. Electrical energy may be output from generator 312 when generator 312 is rotating. Electrical energy may be stored in electric energy storage device 275 to power motor or DISG 240. Further, electrical energy may be directed to vehicle accessories 335. Electrical energy directed to vehicle accessories 335 powers the vehicle accessories 335. Vehicle accessories may include but are not limited to an electric vehicle cabin heater, engine water pump, and air conditioner compressor.

Expanded working fluid gases exit expander 302 and are directed to heat transfer medium or working fluid inlet 328 of condenser 306 where ambient air is passed over condenser 306 to return working fluid gases to a liquid state before the working fluid exits at outlet 329. Working fluid exits condenser 306 in a liquid phase and enters exhaust gas heat recovery system pump 308.

Controller 12 may adjust a flow rate output of exhaust gas heat recovery system pump 308 via adjusting voltage/current supplied to exhaust gas heat recovery system pump 308. Additionally, controller 12 may receive input from temperature sensor 351. Further, controller 12 may adjust a position of exhaust gas heat recovery system valve 304.

Thus, the system of FIGS. 1-3 provides for an engine system, comprising: an engine including an evaporator position along an exhaust system; an expander in fluidic communication with the evaporator; a condenser in fluidic communication with the evaporator; an engine coolant heat exchanger in thermal communication with the condenser, the engine coolant heat exchanger including an output that is in fluidic communication with an input of the evaporator. The engine system further comprises a bypass valve including a first outlet that is in direct fluidic communication with the expander and a second outlet that is in direct fluidic communication with a pump or the engine coolant heat exchanger.

In some examples, the engine system includes where an inlet of the bypass valve is in direct fluidic communication with an outlet of the expander. The engine system further comprises a controller, the controller including instructions stored in non-transitory memory for operating the bypass valve. The engine system includes where the instructions adjust an operating state of the bypass valve in response to an engine operating condition. The engine system includes where the operating state of the engine is based on whether or not the engine is rotating and combusting air and fuel. The engine system includes where the operating state of the engine is based on engine coolant temperature.

Figure 4:
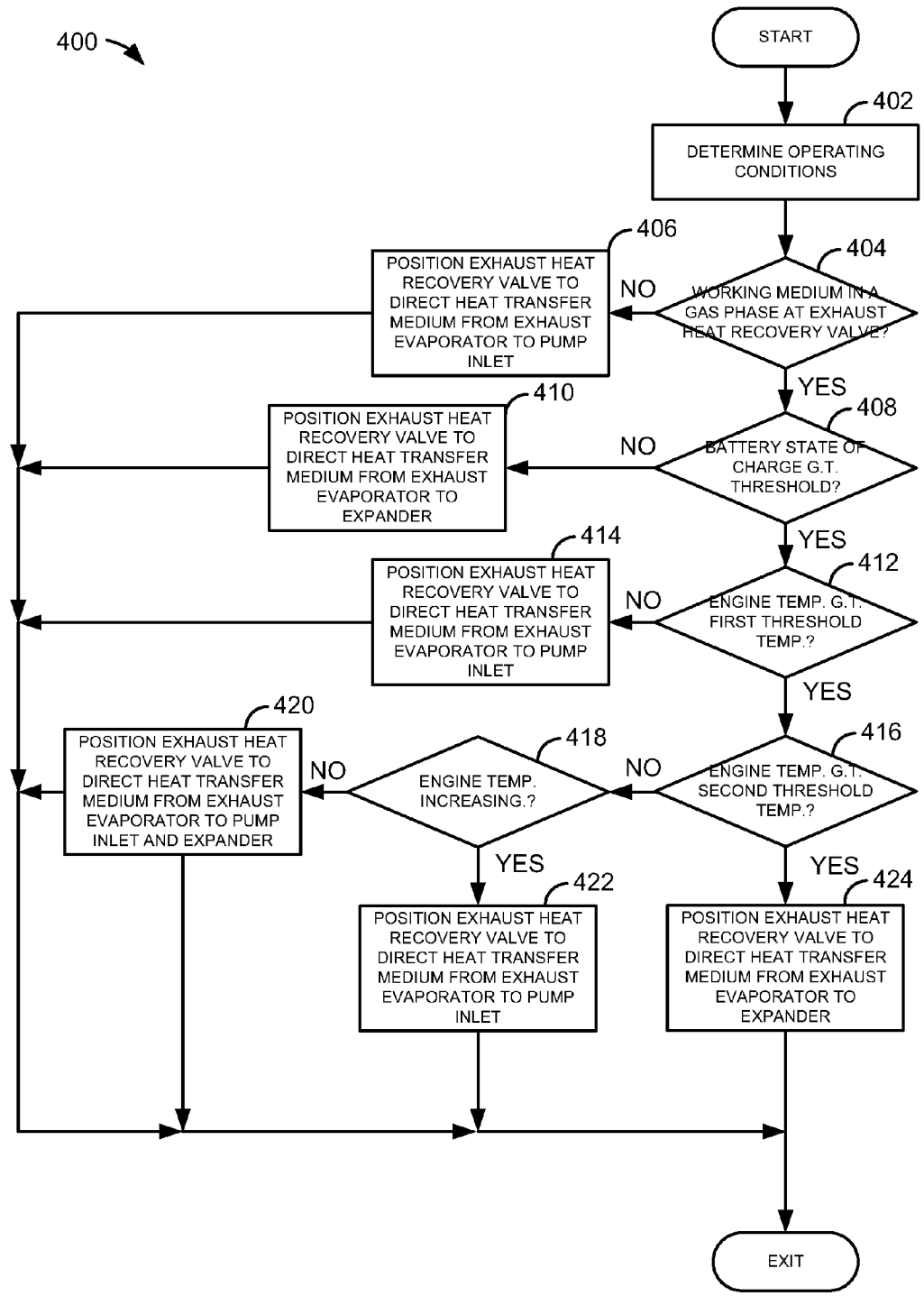
FIG. 4 shows a flowchart for a method for recovering and utilizing exhaust gas energy.
Figure 5:
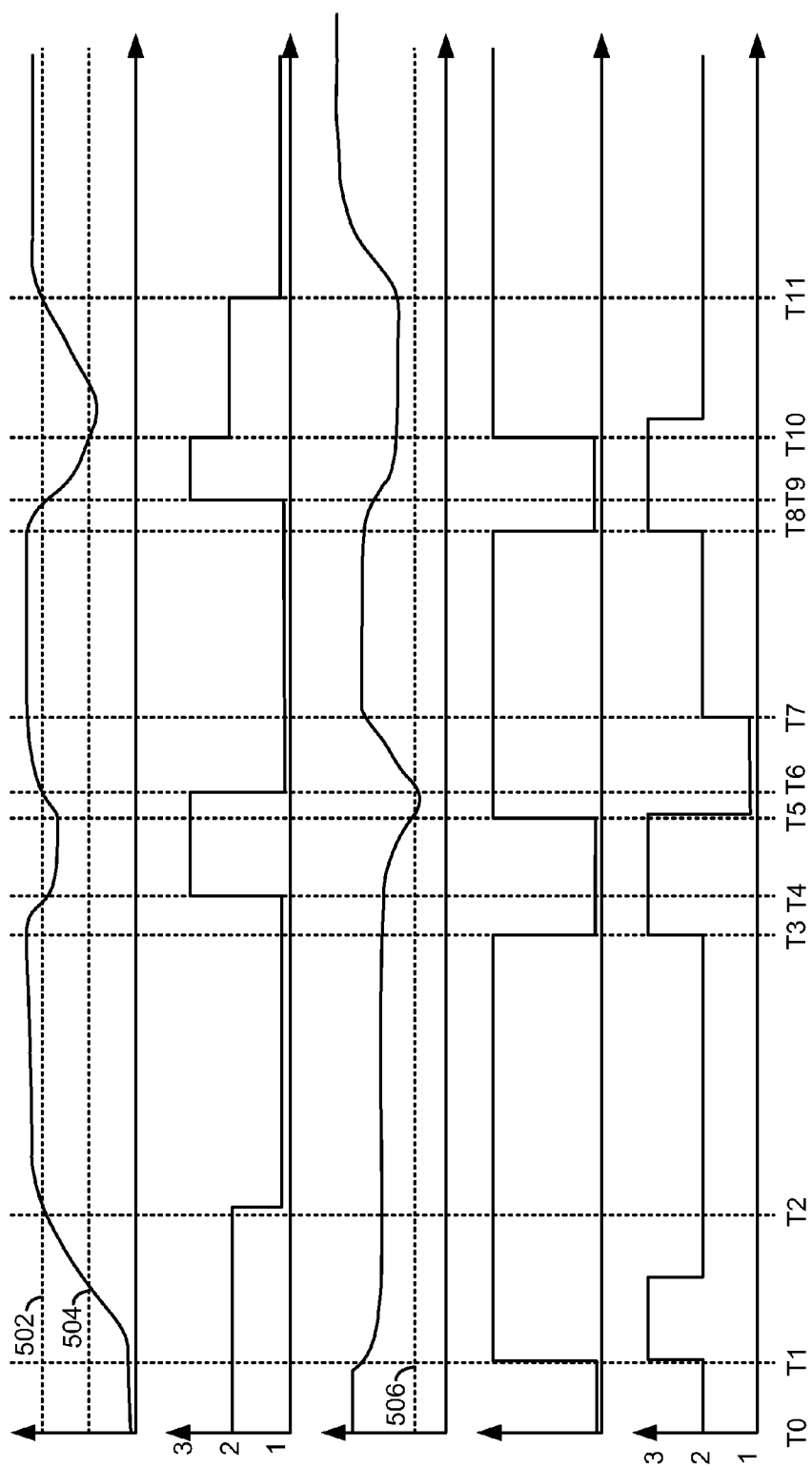
FIG. 5 shows an example prophetic engine operating sequence for a hybrid vehicle.

Referring now to FIG. 4, a flowchart for a method for recovering and utilizing exhaust gas energy in a vehicle is shown. The method of FIG. 4 may be stored as executable instructions in non-transitory memory of the system shown in FIGS. 1-3. Further, the method of FIG. 4 may provide the prophetic operating sequence shown in FIG. 5.

At 402, method 400 determines operating conditions. Operating conditions may include but are not limited to exhaust gas temperature, engine coolant temperature, transmission coolant temperature, exhaust gas heat recovery working fluid temperature at an output side of evaporator 150. Method 400 proceeds to 404 after operating conditions are determined.

At 404, method 400 judges whether or not the working medium (e.g., the material transferring heat within the exhaust gas heat recovery system) is exiting evaporator 150 in a liquid or gaseous state. The working medium may exit evaporator 150 in a liquid state when exhaust gas temperature is insufficient to provide a temperature increase in the working medium that causes the working medium to change state from a liquid to a gas. In one example, method 400 determines whether the working medium exits evaporator 150 in a liquid or gaseous state based on a temperature at an outlet of evaporator 150. If method 400 judges that the working medium is exiting evaporator 150 in a gas state, the answer is yes and method 400 proceeds to 408. Otherwise, the answer is no and method 400 proceeds to 406.

At 406, method 400 adjusts the exhaust gas heat recovery system valve 304 to a second state where output from evaporator 150 is routed solely and directly to an inlet 357 of pump 308. Thus, valve 304 bypasses expander 302 and condenser 306 so that heat energy from engine exhaust gases is provided to engine coolant flowing through heat exchanger 310 and/or transmission/axle 355. In this way, it may be possible to warm engine 10 at a faster rate so as to improve engine fuel economy and emissions. Method 400 proceeds to exit after valve 304 is adjusted to the second operating state.

At 408, method 400 judges whether or no battery state of charge is greater than (G.T.) a first threshold state of charge. The first threshold state of charge is lower than a second state of charge (SOC). In one example, battery SOC is estimated based on battery voltage, or alternatively via coulomb counting. If method 400 judges that battery state of charge is greater than a threshold, the answer is yes and method 400 proceeds to 412. Otherwise, the answer is no and method 400 proceeds to 410.

At 410, method 400 adjusts the exhaust gas heat recovery system valve 304 to a first state where output from evaporator 150 is routed solely and directly to expander 302. Thus, the heated gaseous state working medium is directed to expander 302 where it causes expander 302 to rotate and turn generator 314. Generator 314 converts rotational energy into electrical energy that may be consumed by vehicle accessories. In this way, it may be possible to power vehicle accessories using output of generator 314. Further, the working medium is changed from a gas state to a liquid state after passing through condenser 306. Liquid phase working medium is preheated at heat exchanger 310 when engine coolant temperature is greater than a temperature of the working medium. Method 400 proceeds to exit after valve 304 is adjusted to the second operating state.

At 412, method 400 judges whether or not engine temperature is greater than a first threshold temperature. The first threshold temperature may be a lower temperature than the second threshold temperature at 414. If method 400 judges that engine temperature is greater than the first threshold temperature, the answer is yes and method 400 proceeds to 416. Otherwise, the answer is no and method 400 proceeds to 414.

At 414, method 400 adjusts the position of valve 304 to direct output from evaporator 150 directly to an inlet of pump 308. In other words, expander 302 and condenser 306 are bypassed. By adjusting valve 304 to a second position, engine coolant may be heated while the engine is warming up. Further, the transmission and/or axle 355 may also be warmed with heat from engine exhaust so that friction and viscosity losses may be reduced. Method 400 proceeds to exit after the position of valve 304 is adjusted.

At 416, method 400 judges whether or not engine temperature is greater than a second threshold temperature. The second threshold temperature may be a greater temperature than the second threshold temperature at 412. If method 400 judges that engine temperature is greater than the second threshold temperature, the answer is yes and method 400 proceeds to 424. Otherwise, the answer is no and method 400 proceeds to 418.

At 418, method 400 judges whether or not engine temperature is increasing. Engine temperature may be judged to be increasing when engine temperature is higher over a specified time interval. If method 400 judges that engine temperature is increasing, the answer is yes and method 400 proceeds to 422. Otherwise, the answer is no and method 400 proceeds to 420.

At 420, method 400 adjusts the position of valve 304 to direct output from evaporator 150 directly to an inlet of pump 308 and expander 302. In other words, a portion of heated medium is converted to electrical energy while a second portion has a primary purpose of increasing engine coolant temperature to warm the engine. If the engine coolant temperature is at its operating temperature, and temperature of the heat transfer medium in the exhaust gas heat recovery system is greater than engine coolant temperature, exhaust gas heat is rejected to ambient air via a vehicle radiator. Further, if engine coolant temperature is at a warmed-up level and the heat transfer medium is at a lower temperature, heat exchanger 310 acts to preheat the heat transfer medium in the exhaust gas heat recovery system so that less exhaust gas energy is required to vaporize the heat transfer medium. Method 400 proceeds to exit after the position of valve 304 is adjusted.

At 422, method 400 adjusts the position of valve 304 to direct output from evaporator 150 directly to an inlet of pump 308. Thus, expander 302 and condenser 306 are bypassed. By adjusting valve 304 to a second position, engine coolant may be heated while the engine is warming up. Further, the transmission and/or axle 355 may also be warmed with heat from engine exhaust so that friction and viscosity losses may be reduced. Alternatively, if engine coolant temperature is greater than a temperature of the heat transfer medium in the exhaust gas heat recovery system, heat from exhaust gases may be rejected to atmosphere via radiator 359. Method 400 proceeds to exit after the position of valve 304 is adjusted.

At 424, method 400 adjusts the exhaust gas heat recovery system valve 304 to a first state where output from evaporator 150 is routed solely and directly to expander 302. In this way, the heated gaseous state working medium is directed to expander 302 where it causes expander 302 to rotate and turn generator 314. Generator 314 converts rotational energy into electrical energy that may be consumed by vehicle accessories. Thus, it may be possible to power vehicle accessories using output of generator 314. Further, the working medium is changed from a gas state to a liquid state after passing through condenser 306. Liquid phase working medium is preheated at heat exchanger 310 when engine coolant temperature is greater than a temperature of the working medium. Method 400 proceeds to exit after valve 304 is adjusted to the second operating state.

The method of FIG. 4 provides for a method for operating an engine, comprising: operating an engine; extracting engine exhaust gas heat via an evaporator and converting the engine exhaust gas heat to electrical energy via an expander in a first operating mode; and extracting engine exhaust gas heat via the evaporator and transferring the engine exhaust gas heat to engine coolant via a heat exchanger in a second operating mode. The method includes where the second operating mode is activated in response to engine coolant temperature being less than a first threshold temperature. The method includes where the first operating mode is activated in response to engine coolant temperature being greater than a second temperature threshold, the second temperature threshold greater than the first temperature threshold.

In some examples, the method further comprises adjusting a position of a bypass valve to switch between the first operating mode and the second operating mode. The method further comprises adjusting a position of a bypass valve in response to a temperature of a heat transfer medium exiting the evaporator to switch between the first operating mode and the second operating mode. The method further comprises increasing a temperature of an axle during the second operating mode. The method further comprises preheating a heat transfer medium in the first operating mode before heating the heat transfer medium via engine exhaust gas.

The method of FIG. 4 also provides for a method for operating an engine, comprising: operating an engine combusting an air-fuel mixture; contemporaneously increasing engine coolant temperature and electrical output of a generator via adjusting a bypass valve that routes a heat transfer medium from an evaporator to an expander and an engine coolant heat exchanger during a third operating mode. The method further comprises routing the heat transfer medium from the evaporator solely to the expander via the bypass valve in a first operating mode. The method further comprises routing the heat transfer medium from the evaporator solely to the heat exchanger via the bypass valve in a second operating mode.

In some examples, the method further comprises adjusting a position of the bypass valve in response to an engine temperature. The method further comprises adjusting a position of the bypass valve in response to a temperature of the heat transfer medium. The method further comprises routing the heat transfer medium from the engine coolant heat exchanger to a heater core in a vehicle cabin.

Referring now to FIG. 5, an example prophetic engine operating sequence for a hybrid vehicle is shown. The sequence of FIG. 5 may be provided via the method of FIG. 4 operating in the system of FIGS. 1-3. Vertical lines T0-T11 represent times of interest in the sequence. Each of the plots occurs at the same time as the other plots.

The first plot from the top of FIG. 5 is a plot of engine coolant temperature versus time. The X axis represents time and time increases from the left side of FIG. 5 to the right side of FIG. 5. The Y axis represents engine coolant temperature and engine coolant temperature increases in the direction of the Y axis arrow. The horizontal line 504 represents a first engine threshold temperature. The horizontal line 502 represents a second engine threshold temperature.

The second plot from the top of FIG. 5 is a plot of bypass valve state (e.g., valve 304 operating state) versus time. The X axis represents time and time increases from the left side of FIG. 5 to the right side of FIG. 5. The Y axis represents bypass valve state. Three bypass valve states are numerically indicated along the Y axis. The bypass valve 304 directs the working medium (e.g., water/glycol, refrigerant, etc.) from the outlet of evaporator 150 to expander 302 when positioned in the first state indicated at numeral one. The bypass valve 304 directs the working medium from the outlet of evaporator 150 to the inlet of pump 308 when positioned in a second state indicated at numeral two. The bypass valve 304 directs the working medium from the outlet of evaporator 150 to the inlet of pump 308 and expander 302 when positioned in a third state indicated at numeral three.

The third plot from the top of FIG. 5 is a plot of battery state of charge versus time. The X axis represents time and time increases from the left side of FIG. 5 to the right side of FIG. 5. The Y axis represents battery state of charge and battery state of charge increases in the direction of the Y axis arrow. The horizontal line 506 represents a first threshold state of battery charge.

The fourth plot from the top of FIG. 5 is a plot of engine operating state versus time. The X axis represents time and time increases from the left side of FIG. 5 to the right side of FIG. 5. The Y axis represents engine operating state. The engine is operating when the engine operating state trace is at a higher level. The engine is stopped rotating when the engine operating state trace is at a lower level.

The fifth plot from the top of FIG. 5 is a plot of electric machine (e.g., DISG) state versus time. The X axis represents time and time increases from the left side of FIG. 5 to the right side of FIG. 5. The Y axis represents electric machine state. Three electric machine states are numerically indicated along the Y axis. The electric machine or DISG 240 is operating as a motor (e.g., providing positive torque to the driveline) in the third operating state indicated by numeral three. The electric machine is operating in an off state in the second operating state indicated by numeral two. The electric machine is operating in a generator (e.g., converting mechanical energy into electrical energy and providing a negative torque to the driveline) state in the first operating state indicated by numeral one.

At time T0, the engine coolant temperature is at a low level, the bypass valve is prepositioned to the second operating state, and the engine is off as indicated by the engine state trace being at a lower level. The battery SOC is at a higher level and the electric machine is in an off state. Thus, the vehicle may be stopped and temperatures below normal vehicle operating temperatures.

At time T1, the engine state transitions to a higher level to indicate that the engine is started. The engine may be started in response to a driver or controller engine start request. A driver engine start request may be made via a key switch or pushbutton. The electric machine state transitions from and off state to a motor state in response to the engine start request (not shown). The electric machine may rotate the engine for starting at time T1. The battery state of charge begins to decrease as the motor provides torque to the driveline. The bypass valve is in the second state indicating that the working medium is being directed from the evaporator directly to the pump 308 or to the heat exchanger 310. In this way, exhaust energy may be directed to engine coolant to warm the engine more quickly. The engine coolant temperature is less than first threshold 504, but it begins to increase.

At time T2, the engine coolant temperature is increasing and it reaches second engine threshold temperature 502. The bypass valve changes state in response to the engine temperature reaching threshold temperature 502. The battery SOC has been reduced but is at a steady value greater than threshold 506. The motor is stopped before time T2 and it does not consume electrical energy from the battery when it is stopped.

By changing the operating state of the bypass valve, exhaust gas energy is transferred solely to the generator instead of solely to the heat exchanger. In doing so, exhaust gas energy is transferred to a device that may make more beneficial use of the energy as compared to directing the exhaust gas energy to the heat exchanger after the engine reaches operating temperature. The expander may rotate the generator so that electrical energy may be stored while the engine is warm.

Between time T2 and time T3 the engine continues to operate while the electric machine is off. The battery SOC remains relatively high and the bypass valve remains in the first operating state so that exhaust gas energy is converted into electrical energy. The engine coolant temperature remains at a higher level.

At time T3, the engine state transitions to an engine off state. The engine may be stopped when driver demand torque is low to conserve fuel. The electric machine state is transitioned from an off state to operating as a motor in response to stopping engine rotation. The battery SOC begins to be reduced as the electric machine is activated. The bypass valve continues to operate in state number one after the engine is stopped to continue to extract energy from the exhaust system. The engine coolant temperature begins to transition to a lower level after the engine is stopped.

At time T4, the engine coolant temperature falls below the second threshold level 502 in response to the engine being stopped. The bypass valve state is changed in response to the engine coolant temperature falling below threshold level 502. The engine remains stopped and the battery SOC continues to be reduced as the electric machine consumes energy from the battery.

At time T5, the battery SOC is reduced to less than threshold 506. The engine is restarted in response to the low SOC as indicated by the engine state transitioning to a higher level. The electric machine is switched from a motoring mode (e.g., state 3) to a generating mode (e.g., state 1) shortly after the engine is restarted. The bypass valve remains in the third state where the bypass valve directs the working medium to the expander 302 and the pump 308.

At time T6, the engine coolant temperature increases to a level above the second threshold temperature 502 as the engine operates. The bypass valve changes state in response to engine temperature being greater than threshold temperature 502. In particular, the bypass valve changes to state number one where all output from the evaporator is directed to the expander. The exhaust gas heat recovery system outputs maximum electrical output when the bypass valve is in this state. The battery SOC continues to increase and the electric machine remains in the first state acting as a generator and charging the battery.

At time T7, the battery SOC reaches a level where the electric machine is turned off in response to the higher level SOC. The engine continues to operate and the engine coolant temperature remains at a higher level. The bypass valve remains in state number one.

At time T8, the engine is stopped and the electric machine is activated in a motor operating state as indicated by the engine state trace transitioning to a lower level. The engine may be stopped in response to a lower driver demand torque or other operating conditions (not shown). The electric machine is activated in response to deactivating the engine. The battery state of charge begins to decrease after the electric machine is activated. The bypass valve remains directing the working medium to the expander 302 in response to engine coolant temperature remaining above threshold 502. In some examples, the bypass valve may be switched from state one to state two or three in response to the engine being stopped so that exhaust energy is routed to the pump/heat exchanger instead of solely to the expander in order to elevate engine coolant temperature.

At time T9, engine coolant temperature is reduced to a level less than threshold 502. As a result, the bypass valve state is transitioned from state number one to state number three. The battery state of charge continues to be reduced as the electric machine continues to operate. The engine remains stopped and the electric machine operates.

At time T10, the exhaust gas heat recovery system bypass valve state is transitioned from state number three, where the heat transfer medium is supplied to the expander and the pump, to state number two, where the heat transfer medium is supplied solely to the pump/heat exchanger in response to engine coolant temperature being reduced to less than threshold level 504. The engine is also reactivated in response to engine coolant temperature being at a lower level. The electric machine continues to operate in a motor mode for a period of time after time T10.

At time T11, the engine coolant temperature increases to a level above threshold level 502. The exhaust gas heat recovery system bypass valve changes state from state number two to state number one in response to engine coolant temperature exceeding threshold level 502. The battery state of charge begins to increase as the bypass valve operating state is changed from state number two to state number one. The engine continues to operate and the electric machine is in a stopped state.

Thus, the state of the exhaust gas heat recovery system bypass valve may be adjusted to direct where exhaust gas energy is distributed. In particular, exhaust gas energy may be directed to engine intake coolant to increase engine temperature or to an expander that rotates a generator to provide electrical energy. If the engine is warm, engine coolant energy may be transferred to the heat transfer medium to preheat the heat transfer medium before it enters the evaporator so that less exhaust heat may be needed to vaporize the heat transfer medium.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
an engine including an evaporator positioned along an exhaust system;
an expander in fluidic communication with the evaporator;
a condenser in fluidic communication with the evaporator;
an engine coolant heat exchanger including an inlet in thermal communication with the condenser, the engine coolant heat exchanger including an outlet that is in fluidic communication with an inlet of the evaporator, the engine coolant heat exchanger positioned between a circuit including a working fluid and an engine coolant circuit;
a pump including an inlet;
an exhaust gas heat recovery system valve in fluidic communication with an outlet of the evaporator, an inlet of the expander, and the inlet of the pump; and
a controller including executable instructions stored in non-transitory memory to:
adjust a position of the exhaust gas heat recovery system valve to supply working fluid from the evaporator solely to the inlet of the expander to rotate a generator to produce electrical energy in response to a first condition comprising a state of battery charge being less than a threshold charge; and
adjust the position of the exhaust gas heat recovery system valve to supply working fluid from the evaporator solely to the inlet of the expander to rotate the generator to produce electrical energy in response to a second condition comprising the state of battery charge being greater than the threshold charge and an engine coolant temperature being greater than a first threshold temperature.

2. The engine system of claim 1, where an inlet of the exhaust gas heat recovery system valve is in direct fluidic communication with the outlet of the evaporator.

3. The engine system of claim 1, further comprising a passenger cabin heater core positioned between the outlet and the inlet of the evaporator.

4. A method for operating an engine, comprising:
operating an engine;
extracting engine exhaust gas heat via an evaporator and converting the engine exhaust gas heat to electrical energy via an expander in a first operating mode;
extracting engine exhaust gas heat to a working fluid comprising carbon hydrides via the evaporator and transferring the engine exhaust gas heat from the working fluid to engine coolant via an engine coolant heat exchanger in a second operating mode;
adjusting a position of an exhaust gas heat recovery system valve to operate in the first operating mode in response to a battery state of charge and to direct working fluid solely to the expander in response to the battery state of charge being less than a threshold and regardless of an engine coolant temperature, the expander rotating a generator to produce electrical energy in the first operating mode; and
adjusting the position of the exhaust gas heat recovery system valve to operate in the second operating mode in response to the battery state of charge being greater than the threshold and the engine coolant temperature being less than a first threshold temperatures;
where the first operating mode is activated in response to the battery state of charge being greater than the threshold and the engine coolant temperature being greater than a second threshold temperature, the second threshold temperature greater than the first threshold temperature.

5. The method of claim 4, further comprising flowing the working fluid from the exhaust gas heat recovery system valve to the expander while flowing the working fluid from the exhaust gas heat recovery system valve to a pump bypassing the expander in response to an engine operating condition.

6. The method of claim 4, further comprising adjusting the position of the exhaust gas heat recovery system valve to switch between the first operating mode and the second operating mode.

7. The method of claim 4, further comprising adjusting the position of the exhaust gas heat recovery system valve in response to a temperature of a heat transfer medium exiting the evaporator to switch between the first operating mode and the second operating mode; and
wherein the second operating mode is further activated in response to the battery state of charge being greater than the threshold and the engine coolant temperature being between the first and second threshold temperatures.

8. The method of claim 7, further comprising increasing a temperature of an axle during the second operating mode; and
wherein, in the second operating mode, working fluid is additionally directed to the expander in response to the engine coolant temperature not increasing.

9. The method of claim 8, further comprising preheating the heat transfer medium in the first operating mode before heating the heat transfer medium via engine exhaust gas; and
wherein, in the second operating mode, working fluid is solely directed to the engine coolant heat exchanger in response to the engine coolant temperature increasing.

10. A method for operating an engine, comprising:
operating an engine; and
contemporaneously increasing an engine coolant temperature and electrical output of a generator via adjusting an exhaust gas heat recovery system valve that routes a heat transfer medium from an evaporator to an expander and an engine coolant heat exchanger responsive to vehicle operating conditions including a battery state of charge being greater than a threshold and the engine coolant temperature being above a first threshold temperature and not increasing during a first operating mode, the expander rotating the generator to provide electrical energy in the first operating mode.

11. The method of claim 10, further comprising routing the heat transfer medium from the evaporator solely to the expander via the exhaust gas heat recovery system valve in a second operating mode in response to the battery state of charge being less than the threshold.

12. The method of claim 11, further comprising routing the heat transfer medium from the evaporator solely to the engine coolant heat exchanger via the exhaust gas heat recovery system valve in a third operating mode in response to the battery state of charge being greater than the threshold and the engine coolant temperature being below a second threshold temperature and increasing, the second threshold temperature greater than the first threshold temperature.

13. The method of claim 10, further comprising adjusting a position of the exhaust gas heat recovery system valve in response to an engine temperature, and where the vehicle operating conditions include an increasing engine temperature.

14. The method of claim 10, further comprising adjusting a position of the exhaust gas heat recovery system valve in response to a temperature of the heat transfer medium.

15. The method of claim 10, further comprising routing the heat transfer medium from the engine coolant heat exchanger to a heater core in a vehicle cabin.

16. The engine system of claim 1, further comprising instructions to adjust the position of the exhaust gas heat recovery system valve to supply working fluid from the evaporator to the engine coolant heat exchanger to transfer heat from the working fluid to coolant in response to a third condition comprising the state of battery charge being greater than the threshold charge and the engine coolant temperature being less than the first threshold temperature.

17. The engine system of claim 16, wherein, in the third condition, working fluid is supplied from the evaporator solely to the engine coolant heat exchanger responsive to the engine coolant temperature being less than a second threshold temperature, the second threshold temperature being lower than the first threshold temperature.

18. The engine system of claim 17, wherein, in the third condition, working fluid is supplied from the evaporator solely to the engine coolant heat exchanger responsive to the engine coolant temperature being greater than the second threshold temperature and the engine coolant temperature increasing.

19. The engine system of claim 18, wherein, in the third condition, working fluid is additionally supplied from the evaporator to the inlet of the expander to rotate the generator to produce electrical energy in response to the engine coolant temperature being greater than the second threshold temperature and the engine coolant temperature not increasing.

* * * * *